Figure 1:
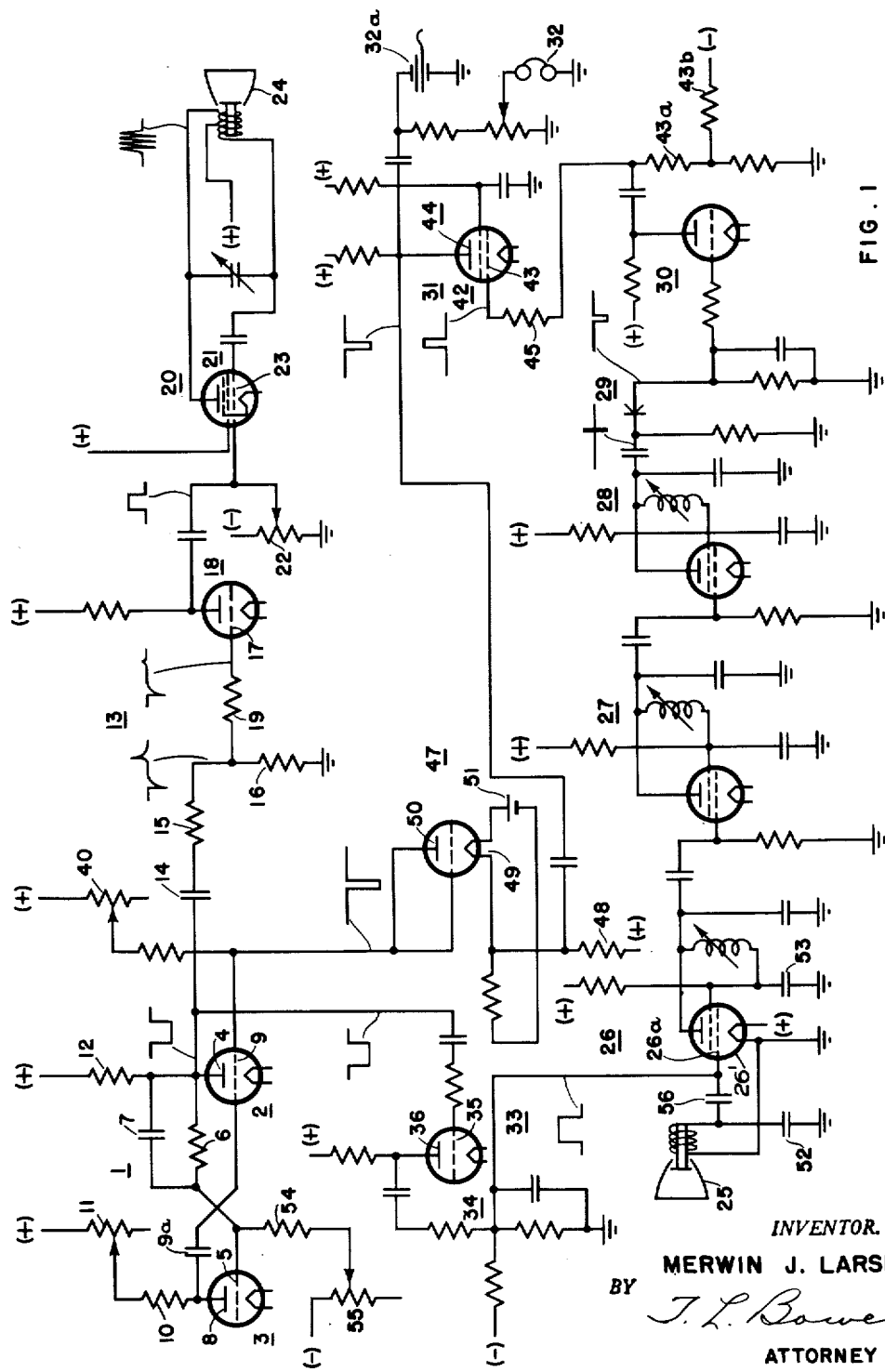

Jan. 1, 1952 M. J. LARSEN 2,580,560
ECHO PULSE SYSTEM UTILIZING THE FIRST RECEIVED
ECHO FOR CONTROL PURPOSES
Filed May 17, 1947 2 SHEETS—SHEET 1

INVENTOR.
MERWIN J. LARSEN
BY
*J. L. Bowes*
ATTORNEY

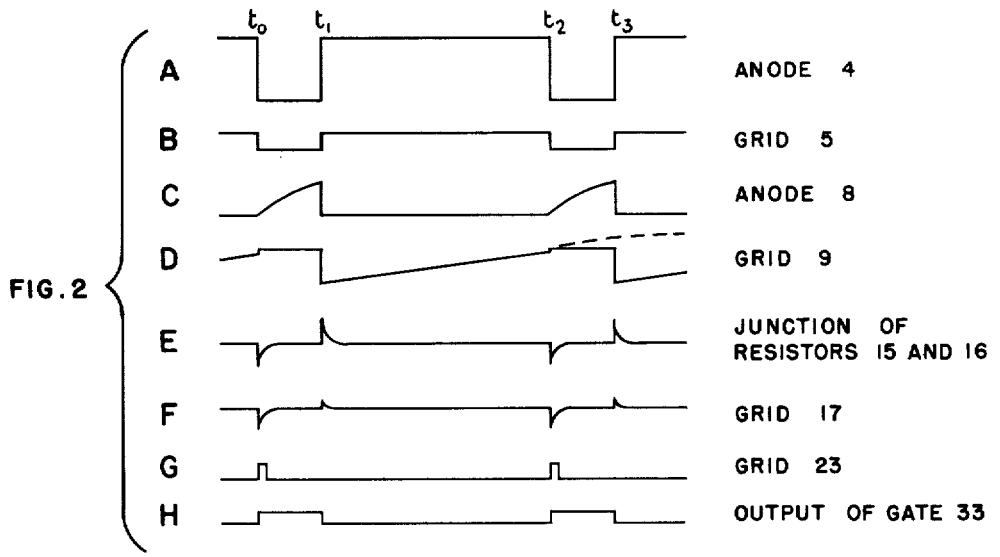
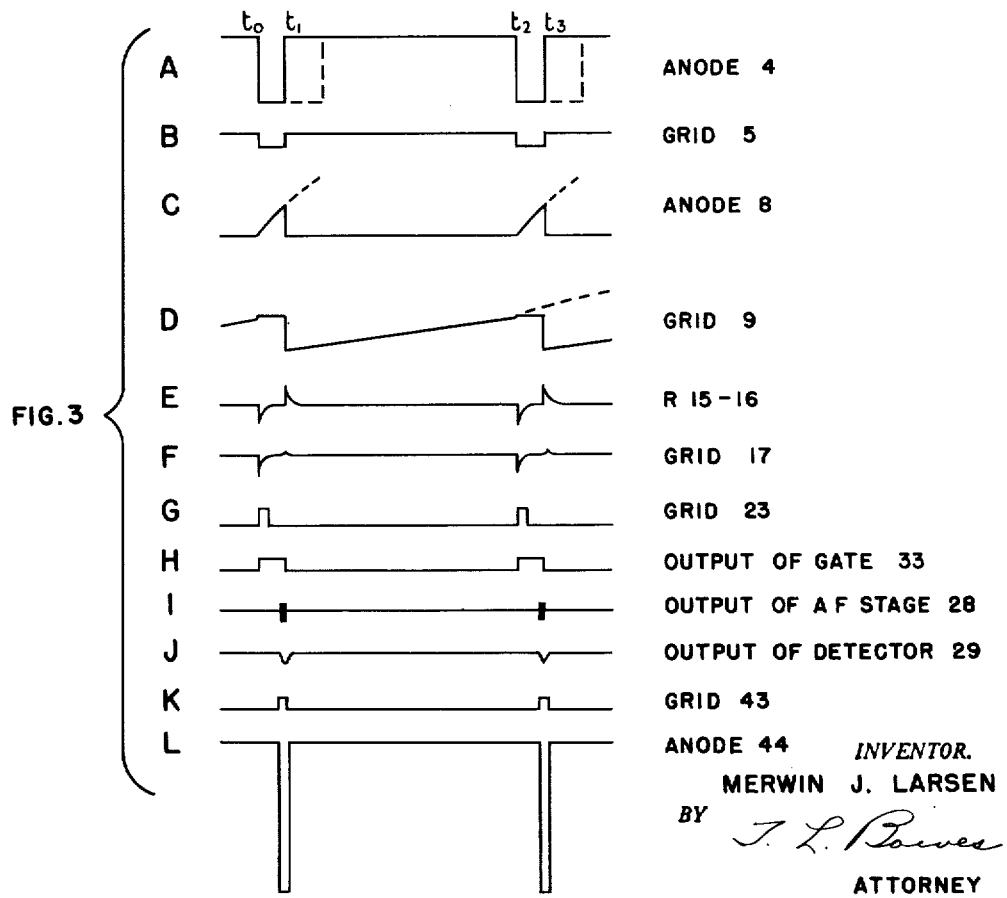

Patented Jan. 1, 1952

2,580,560

UNITED STATES PATENT OFFICE 2,580,560

ECHO PULSE SYSTEM UTILIZING THE FIRST RECEIVED ECHO FOR CONTROL PURPOSES

Merwin J. Larsen, Villa Park, Ill., assignor to Stromberg-Carlson Company, a corporation of New York Application May 17, 1947, Serial No. 748,814

4 Claims. (Cl. 343—13)

1

This invention relates to a pulse ranging system for transmitting and receiving pulses and more particularly to such a system suitable for aiding the blind in locating objects.

It is an object of my invention to provide a new and improved pulse-echo ranging system in which the emitted pulse rate depends upon the distance to the object causing the return of echo pulses.

It is another object of my invention to provide a new and improved ranging system in which the time elapsing between a transmitted or emitted pulse and the first received echo pulse determines the time of the next pulse to be transmitted.

Still another object of my invention is to provide a new and improved ranging system in which the receiver is gated in response to the transmission of a pulse and the transmitter is triggered by the receiver in response to echoes received from objects within a predetermined distance.

Another object of my invention is to provide a new and improved ranging system responsive only to echoes returned from a predetermined object located less than a predetermined distance away, the distance of response being variable.

It is a further object of this invention to provide a new and improved ranging system in which the receptor device or devices associated therewith respond only to the first echo, representing the closest object in the line of propagation or emission and reception, and not to a group of echoes returning from an array of objects.

In accordance with my invention there is provided a pulse transmitter and a pulse-echo receiver. Each transmitted pulse is utilized to gate the receiver so that the receiver is operative to respond only to echoes of the transmitted pulses reflected from objects within a predetermined distance. The transmitter includes a source of pulses, such as a multivibrator, for example. These pulses cause emission of pulses from the transmitter and also render operative the receiver. Any pulse-echo received during the gated period is employed to trigger the pulse source or generator for generating and transmitting the next pulse. Thus the time elapsing between the transmission or emission of a pulse and the receipt of the corresponding echo determines the time of emission of the next pulse. In other words, the repetition rate of emitted pulses is determined by the distance of the object from which echoes are returned.

When utilized as a blind-aid ranging device, a directional radiator and a directional microphone are preferably used. When both radiator and microphone are directed simultaneously at an object by the user, the pulse rate is relatively

2 fast for a close object and slower for more distant objects, thereby providing an indication of the distance to the object.

The features of my invention which I believe to be novel are set forth with particularity in the appended claims. My invention itself, both as to its organization and manner of operation, together with further objects and advantages thereof, may best be understood by reference to the following description taken in connection with the accompanying drawings, in which Figure 1 is a schematic diagram of suitable circuits for carrying out the objects of this invention, and Figures 2 and 3 are diagrams helpful to a full understanding of the subject invention.

Referring to the drawings, and particularly Figure 1, there is shown a pulse generator or source of pulses 1, illustrated as a multivibrator comprising electron discharge devices 2 and 3, illustrated as triodes. Anode 4 of discharge device 2 is connected to control electrode or grid 5 of discharge device 3 through shunt-connected resistance 6 and capacitance 7, and anode 8 of discharge device 3 is connected to control electrode or grid 9 of discharge device 2 through a suitable capacitance 9a. Filament type, sub-miniature tubes are preferred if the ranging system herein described and claimed is used for blind-aid in order to minimize the size of the apparatus. Anode 8 is connected to a suitable source of positive D. C. potential through suitable resistance means, such as resistance 10 and potentiometer 11, the latter enabling adjustment of operation as more fully described later in this specification. Anode 4 is shown connected to a suitable source of positive potential through suitable resistance 12.

Multivibrator output pulses, appearing at the anode 4, are illustrated at Figures 2A and 3A (Fig. 2 representing idling conditions when no echoes are reproduced, and Fig. 3 representing non-idling conditions). Time $t_0$ represents the instant at which discharge device 2 becomes conducting, the anode potential dropping as indicated. At time $t_1$, discharge device 2 is cut off and discharge device 3 rendered conducting. The anode potential of device 2 rises to the full value of the source.

In the illustrative form of this invention, the negative going output pulses of source 1 are differentiated as by means of a capacitor 14 and resistances 15 and 16 of suitable values of capacitance and resistance respectively, and connected in series between anode 4 and ground. The resulting "pips" are shown in both Fig. 1 and at Figs. 2E and 3E. It is desirable to limit the positive pips and hence the differentiated pulses may be impressed upon the grid 17 of discharge device 18 through a suitable resistance 19. Thus, substantially only negative pips are impressed on control electrode or grid 17 as indicated in Figs. 2F and 3F. Positive pips as shown in Figs. 2G and 3G, appear in the output of device 18.

There is shown an oscillator 20 of high-frequency energy including an electron discharge device 21 which is preferably normally biased beyond cut-off, as by means of a suitable potentiometer 22, the resistance of which is connected between ground and a suitable source of negative potential. Positive pulses on control element or grid 23 of discharge device 20 cause operation of the oscillator and emission of a pulse of R. F. energy from a suitable radiator 24.

The duration of the transmitted or emitted pulse is determined by the differentiating network comprising capacitance 14, and resistances 15 and 16, as well as the amplitude of the pips applied to grid 17 as determined by the ratio of resistance 15 to resistance 16, unless the pulse duration is so long that an echo from a close object returns before termination of the pulse.

The receiving section illustrated in the drawing comprises a microphone 25 which may be identical to radiator 24. As normally used, devices 24 and 25 are mounted together so that both are pointed simultaneously in the same direction. There are also shown three R. F. sections, 26, 27, and 28, a detector 29, which may be of the crystal type as illustrated, and two stages 30 and 31 of audio-frequency amplification. Provision is made for auditory and tactile reception in the output, as by means of headphones 32 and a crystal device 32a, for example. The receiver is normally maintained inoperative, as by biasing discharge device 26' beyond cut-off.

In order to gate the receiver a gating section or circuit is provided as a source of voltage to render operative the receiver. The circuit shown comprises a phase inverting stage 33 including an electron discharge device 34 having a control electrode or grid 35 and an anode 36. The negative going output pulses from the pulse source 1 are impressed on grid 35. The resulting positive going pulses appearing at anode 36 are applied to the receiver at grid or control electrode 26a of discharge device 26'.

Referring to Figs. 2 and 3, the receiver is gated or rendered operative to reproduce received echoes during the interval $t_0$ to $t_1$, the front or leading edge of an output pulse appearing in the output of pulse source 1 at time $t_0$. At time $t_1$, the pulse is terminated, as by change over of the multivibrator, and the receiver is cut-off. From time $t_1$ to time $t_2$, the receiver is inoperative insofar as pulse echo reproduction is concerned.

Bias of discharge device 3, as by means of resistances 54 and 55, is chosen such that free running of the multivibrator is obtained and circuit constants are preferably chosen so that discharge device 2 is conductive a relatively small portion of a complete cycle, as one-eighth of the time, for example, i. e., period $t_0$ to $t_1$ may be approximately one-eighth of the period $t_0$ to $t_2$. Fig. 2 represents idling conditions, i. e., power on but no echoes received within the gating period. Let it be assumed that discharge device 2 begins to conduct at time $t_0$ (Fig. 2A). At this instant, the potential of grid 5 of discharge device 3 is forced below cut-off (Fig. 2B). Capacitor 9a now charges through resistors 10 and 11. During the charging interval of capacitor 9a, the potential of grid 9 is slightly above the potential of its cathode. When capacitor 9a is nearly charged, grid 9 is urged less strongly above its cathode and anode 4 rises slightly. The amount of rise of potential at anode 4 necessary before grid 9 moves above cut-off is determined by the resistance ratio of resistors 6 and 54 and also by the negative bias set by potentiometer 55. As soon as the changeover point is reached at time $t_1$, discharge device 3 conducts and discharge device 2 is cut-off. Capacitor 9a discharges through resistor 40, the resistance of resistor 40 being preferably much greater than the resistance of resistor 11, until grid 9 rises above cut-off at time $t_2$, whence the cycle repeats.

Under idling conditions, there is no response at the receiver output because any echoes arrive after time $t_1$ when the receiver is cut off. The gating pulses are filtered out by the high-frequency stages which are tuned to the oscillator frequency, which is preferably substantially different from the idling repetition rate.

Mention has been made of means to enable the cut-off or elimination of all echoes returned from objects located farther away than a predetermined distance. The above-mentioned gating action provides the distance cut-off feature. Means is provided to vary the time of cut-off. In the illustrated form of the invention cut-off is determined by the change-over or re-setting of the multivibrator. In order to change the period of operation of the multivibrator, it is necessary to change its recovery period, as by changing the R.-C. time constant of the multivibrator. In the present form of this invention, control is provided by means of potentiometer 11. If desired, capacitor 9a can also be made variable, or means may be provided to enable the ready substitution of fixed capacitors of different values of capacitance.

Means is also provided for varying the repetition rate, as by varying the period of time between the termination of one pulse and the beginning of the next. Referring to Figs. 2 and 3, this period is that between $t_1$ and $t_2$. Resistance 11 affects not only the cut-off distance but also the rate, because it varies the R.-C. time constant. Resistor 40 connected between grid 9 of discharge device 2 and a suitable source of D. C. potential provides an additional rate control. Since cut-off depends upon the charging rate of capacitor 9a, adjustment of resistance 40 does not affect the cut-off of the system.

Fig. 3 represents non-idling conditions of the system in which case echoes are received before cut-off. Under this condition, means is provided to trigger off the multivibrator before the free running changeover time. At Fig. 3I there is represented an echo as it appears at the output of R. F. stage 28 at time $t_1$. The detector output is shown at Fig. 3J. The negative going pulses from the detector 29 are inverted in A. F. stage 30, as indicated at Fig. 3K.

The output stage includes a discharge device 42 having a control electrode or grid 43 and an anode 44. Discharge device 41 is normally biased beyond cut-off as by means of a connection to a suitable source of negative potential through suitable resistances 43a and 43b. A suitable resistance 45 is provided to limit pulse amplitude if the signal voltage is excessive. The cut-off bias is so arranged that the inverted pulses from A. F. stage 30 render operative output stage 31. A narrow negative going pulse appears at anode 44 of discharge device 42. These pulses activate the headphones 32 and the tactile device 32a, and provide multivibrator trigger pulses.

The trigger pulses may be applied directly to grid 9 of pulse generator 1, or by means of capacitive coupling. However, in order to prevent any tendency of the grid 9 of discharge device 2 to follow the potential of the trigger pulse, it is preferred to insert a unilateral device 47 such as a diode or a triode connected as a diode and a floating filament supply 51 in the trigger connection. Moreover, the preferred arrangement, being unilateral in nature, prevents idling pulses in the multivibrator output from feeding back into the auditory and tactile reproducers or transducers. The last purpose may be accomplished by connecting a resistor 48 between the filament 49 and a suitable source of positive potential in order to cause the filament to be always slightly more positive than the anode 50 in the absence of receiver output. If filament type tubes are used, the source of filament bias may be the transmitter filament supply.

The receiver responds only to the first echo because the receiver output pulse, Fig. 3L, triggers off the multivibrator, terminating the multivibrator output pulse before it would terminate under idling conditions and hence cuts off the receiver so that the receiver is inoperative to reproduce echoes received thereafter during the cut-off period.

From the foregoing description, it is seen that the closer the object, the shorter or narrower the pulse width and hence the more pulses emitted in any given period of time.

If desired, instead of returning trigger pulses through the unilateral device 47, the output of the receiver can be differentiated and the trailing edge of the pulse, which is positive utilized to render conductive discharge device 3. This arrangement is less desirable because the hape of the receiver output pulses varies somewhat w th the amplitude of the echoes, and d'ng pulse may get into the reproducing devices 32 and 32a Moreover, negative-going trigger pulses are preferred because the output stage 31 may be cut off most of the time. thus saving battery drain and permitting the discharge device to be forced without damage.

The unilateral device 47, while preferably a diode or its equivalent, may be of any type having sufficient'y high inverse resistance or sufficiently low shunt capacitance.

The capacitor 7 preferably has a small value of capacitance and aids, during cross-over, to overcome the retarding effect of the grid-to-cathode capacitance of discharge device 3.

In order to prevent excessive delay in the passage of the gated pulse representing the received echo, a capacitor 56 of small capacitanuce, as of the order of 100 micromicrofarads, is provided in the input circuit of high-frequency stage 26

If a magnetostriction microphone 25 is used, a capacitor 52 is preferably connected between the microphone and ground to tune the microphone coil.

In order to prevent the gating pulses from being transmitted through the receiver, there is provided a capacitor 53 of relatively large capacitance, as of the order of 4 microfarads, connected as shown.

What I claim is:

1. In a pulse ranging sysetem, a source of pulses, means utilizing said pulses for effecting the transmission of pulses of high-frequency energy, normally inoperative means for receiving echoes of each said transmitted pulse, means responsive to the transmission of pulses for rendering operative said receiving means, means utilizing the first of said received echoes for again rendering inoperative said receiving means, and means for causing the transmission of the next transmitted pulse a predetermined time after the receipt of said first echo.

2. In a pulse ranging system, a source of pulses, means utilizing said source of pulses for effecting the transmission of a pulse of high-frequency energy, normally inoperative means for receiving echoes of said transmitted pulse, means responsive to the transmission of pulses for rendering operative said receiving means, means utilizing the first of said received echoes for again rendering inoperative said receiving means and means for causing the transmission of the next transmitted pu'se a pr determ ned time after the receipt of said firs echo, and means for rendering said echo-receiv ng means inoperative a prede termined time a ter the transmission of said first-mentioned transmitted pulse if no echo is received during said p edetermined time.

3. In a pulse ranging system, a source of control pulses, means utilizing said source of pulses for effecting the transmission of a pulse of high frequency energy during each control pulse, normally inoperative means for receiving echoes of said transmitted pulse, means for rendering operative said receiving means at the start of each control pulse, means utiliz'ng the first echo of said transmitted pulse received during the operative period of said receiving means to again render inoperative said receiving means until the appea, ance of the nex: control pulse and means for rendering inoperative said receiving means at the nd of each control pulse if no echo is received during the period of each control pulse 4 In  pulse ranging system a source of control pul. es, means utilizing said source of pulses for effecting the transmission of a pulse of high frequenc energy during each control pu'se normally inoperative means for receiving echoes of said transmitted pulse, means for rendering operative said receiving means at the start of each control pulse means utilizing the first echo of said transmitted pulse received during the operative period of said receiving means to again render inoperative said receiving means until the appearance of the next control pulse. means for rendering inoperative said receiving means at the end of each control pulse if no echo is received during the period of each control pulse, and means responsive to said first echo for initiating the transmission of the next transmitted pulse.

MERWIN J LARSEN

REFERENCES CITED

The following references are of record in the file of this patent:

UNITED STATES PATENTS

| Number | Name | Date |
| --- | --- | --- |
| 1,945 952 | Nicolson | Feb 6, 1934 |
| 2,333,688 | Shepard | Nov 9, 1943 |
| 2,400,309 | Kock | May 14, 1946 |
| 2,403,527 | Hershberger | July 9, 1946 |
| 2,406,316 | Blumlein | Aug 27, 1946 |
| 2,421,018 | De Rosa | May 27, 1947 |
| 2,422,382 | Winchel | June 17, 1947 |
| 2,428,799 | Hayes | Oct 14, 1947 |
| 2,454,772 | Chatterjea et al. | Nov 30, 1948 |
| 2,495,690 | Bradley | Jan 31, 1950 |

Certificate of Correction

Patent No. 2,580,560 January 1, 1952

MERWIN J. LARSEN

It is hereby certified that error appears in the printed specification of the above numbered patent requiring correction as follows:

Column 3, line 14, for "R. F." read *high frequency*; column 4, line 67, for "device 41" read *device 42*; column 5, line 60, for "capacitanuce" read *capacitance*; line 73, for "sysetem" read *system*;

and that the said Letters Patent should be read as corrected above, so that the same may conform to the record of the case in the Patent Office.

Signed and sealed this 13th day of May, A. D. 1952.

[SEAL]

THOMAS F. MURPHY,
*Assistant Commissioner of Patents.*